United States Patent
Dierks, Jr. et al.

(10) Patent No.: US 7,356,664 B2
(45) Date of Patent: Apr. 8, 2008

(54) METHOD AND APPARATUS FOR TRANSFERRING DATA FROM A MEMORY SUBSYSTEM TO A NETWORK ADAPTER FOR IMPROVING THE MEMORY SUBSYSTEM AND PCI BUS EFFICIENCY

(75) Inventors: Herman Dietrich Dierks, Jr., Round Rock, TX (US); Binh K. Hua, Austin, TX (US); Sivarama K. Kodukula, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 10/621,931

(22) Filed: Jul. 17, 2003

(65) Prior Publication Data

US 2005/0015564 A1 Jan. 20, 2005

(51) Int. Cl.
*G06F 12/00* (2006.01)
(52) U.S. Cl. ............... 711/201; 711/154; 711/200
(58) Field of Classification Search ............ 711/100, 711/118, 154, 171, 201; 709/232
See application file for complete search history.

(56) References Cited

U.S. PATENT DOCUMENTS

| | | | | |
|---|---|---|---|---|
| 5,265,228 A | * | 11/1993 | Beaudoin et al. | 710/306 |
| 5,446,898 A | * | 8/1995 | Bealkowski et al. | 713/1 |
| 5,535,338 A | * | 7/1996 | Krause et al. | 709/222 |
| 5,684,997 A | * | 11/1997 | Kau et al. | 710/260 |
| 5,710,911 A | * | 1/1998 | Walsh et al. | 713/500 |
| 5,901,291 A | * | 5/1999 | Feeney et al. | 709/253 |
| 5,911,152 A | * | 6/1999 | Wooten | 711/208 |
| 6,055,580 A | | 4/2000 | Chen et al. | |
| 6,141,705 A | | 10/2000 | Anand et al. | |
| 6,456,283 B1 | | 9/2002 | Ishida | |
| 6,625,806 B1 | | 9/2003 | Ono et al. | |
| 6,633,832 B1 | | 10/2003 | Browen | |
| 6,820,186 B2 | | 11/2004 | Webber et al. | |
| 2002/0095554 A1 | | 7/2002 | McCrory et al. | |

OTHER PUBLICATIONS

Dierks, Jr. et al., Method and Apparatus for Transferring Data from a Memory Subsystem to a Network Adapter by Extending Data Lengths to Improve the Memory Subsystem and PCI Bus Efficiency.

* cited by examiner

*Primary Examiner*—Tuan V. Thai
(74) *Attorney, Agent, or Firm*—Duke W. Yee; Mark E. McBurney

(57) ABSTRACT

A method, apparatus, and computer instructions for transferring data from a memory to a network adapter. A request is received to transfer data to a network adapter. An offset is set for a starting address of the data to align the data with an end of a frame in the memory, wherein the frame is transferred from the memory to the network adapter.

18 Claims, 4 Drawing Sheets

| PCI COMMAND | NUMBER OF BYTES TRANSFERRED | CUMULATIVE TOTAL | |
|---|---|---|---|
| MRM | 512 | 512 | 402 |
| MRM | 512 | 1024 | 404 |
| MRM | 384 | 1408 | 406 |
| MR | 8 | 1416 | 408 |
| MR | 8 | 1424 | 410 |
| MR | 8 | 1432 | 412 |
| MR | 8 | 1440 | 414 |
| MR | 8 | 1448 | 416 |
| MR | 8 | 1456 | 418 |
| MR | 8 | 1464 | 420 |
| MR | 8 | 1472 | 422 |
| MR | 8 | 1480 | 424 |
| MR | 8 | 1488 | 426 |
| MR | 8 | 1496 | 428 |
| MR | 8 | 1504 | 430 |
| MR | 8 | 1512 | 432 |
| MR | 2 | 1514 | 434 |

*FIG. 4*
*(PRIOR ART)*

| PCI COMMAND | NUMBER OF BYTES TRANSFERRED | CUMULATIVE TOTAL | |
|---|---|---|---|
| MRM | 490 | 490 | 602 |
| MRM | 512 | 1002 | 604 |
| MRM | 512 | 1514 | 606 |

METHOD AND APPARATUS FOR TRANSFERRING DATA FROM A MEMORY SUBSYSTEM TO A NETWORK ADAPTER FOR IMPROVING THE MEMORY SUBSYSTEM AND PCI BUS EFFICIENCY

CROSS REFERENCE TO RELATED APPLICATIONS

The present invention is related to an application entitled "Method and Apparatus for Transferring Data From a Memory Subsystem to a Network Adapter by Extending Data Lengths to Improve the Memory Subsystem and PCI Bus Efficiency", Ser. No. 10/621,948, filed even date hereof, assigned to the same assignee, and incorporated herein by reference.

BACKGROUND OF THE INVENTION

1. Technical Field

The present invention relates generally to an improved data processing system and in particular to a method and apparatus for transferring data. Still more particularly, the present invention relates to a method and apparatus for transferring data from a memory subsystem to a network adapter.

2. Description of Related Art

The data processing systems includes a bus architecture for transferring data between various components. One type of bus architecture is a Peripheral Component Interconnect (PCI). PCI provides a high-speed data path between the CPU and peripheral devices, such as memory subsystem, a network adapter, and a video adapter.

With respect to transferring data between a memory subsystem and an input/output (I/O) subsystem using a PCI bus, efficiencies in transferring data are dependent on cache aligned data transfers from the memory subsystem to the I/O subsystem. Efficiencies are greatest when the total data transfer is an integral multiple of the cache line size (CLS). For-example, transfers to a disk storage system fit this model in which typical transfers have sizes, such as 512, 1024, 2048, and 4096 bytes.

These efficiencies are typically not found with some I/O subsystems, such as network adapters. For example, a maximum Ethernet frame size is 1514 bytes, which is not divisible by any CLS. A CLS is typically $2^n$ in size. As a result, the remainder of the data is transferred in a small quantity, requiring I/O cycles. This type of overhead becomes significant for high bandwidth network adapters, such as those capable of transferring 10 Gbs.

Therefore, it would be advantageous to have an improved method, apparatus, and computer instructions for transferring data from a memory to a network adapter.

SUMMARY OF THE INVENTION

The present invention provides a method, apparatus, and computer instructions for transferring data from a memory to a network adapter. A request is received to transfer data to a network adapter. An offset is set for a starting address of the data to align the data with an end of a frame in the memory, wherein the frame is transferred from the memory to the network adapter

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating a table of data transfer commands made in transferring data from a memory subsystem to a network adapter using a current transfer process;

FIG. 6 is a diagram of commands used to transfer a frame of data in accordance with a preferred embodiment of the present invention.

DETAILED DESCRIPTION OF THE PREFERRED EMBODIMENT

Figure 1:
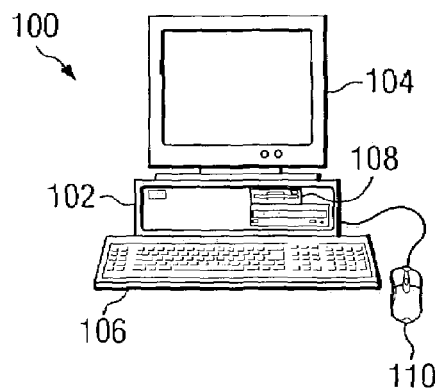
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or Intellistation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
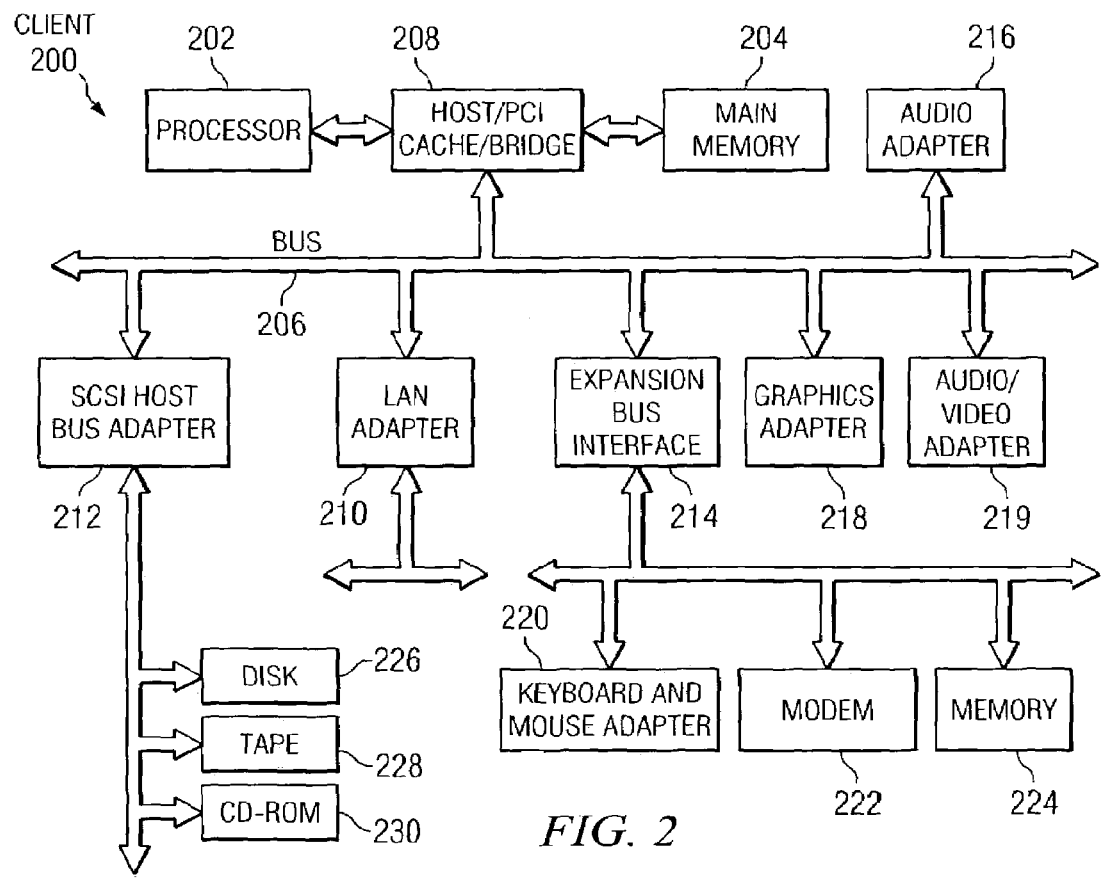
FIG. 2 is a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to. PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figure 3:
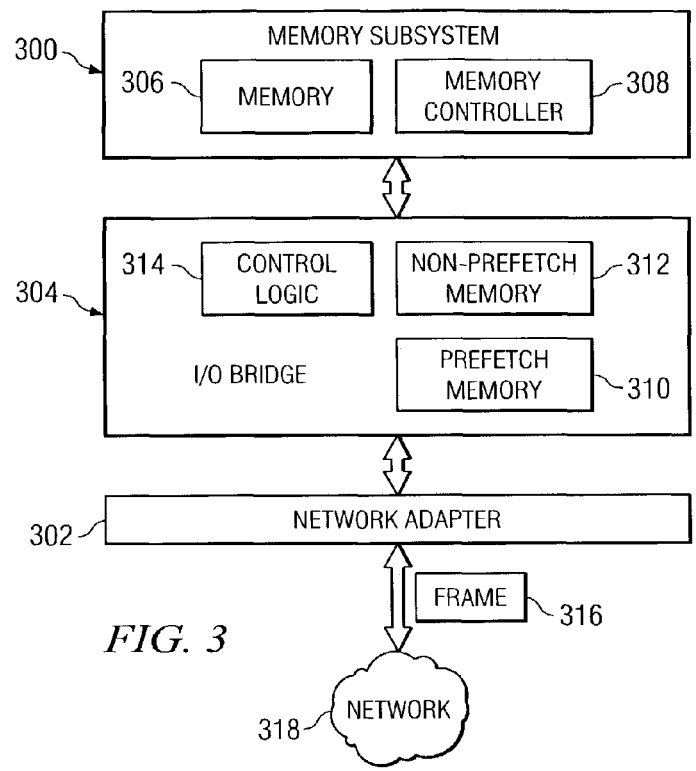
FIG. 3 is a diagram illustrating components used in transferring data from a memory subsystem to a network adapter in accordance with a preferred embodiment of the present invention.

Turning now to FIG. 3, a diagram illustrating components used in transferring data from a memory subsystem to a network adapter is depicted in accordance with a preferred embodiment of the present invention. The components illustrated in FIG. 3 may be implemented in a data processing system, such as data processing system 200 in FIG. 2.

In this example, data is transferred from memory subsystem 300 to network adapter 302 using I/O bridge 304. Memory subsystem 300 includes memory 306 and memory controller 308. In this example, memory 306 is a system or main memory, such as main memory 204 in FIG. 2. Memory controller 308 may take various forms, such as a processor or an application specific integrated circuit (ASIC). The data to be transferred is located in memory 306. Memory controller 308 is used to control the transfer of data from memory 306 to I/O bridge 304, which may be found in host/PCI/cache bridge 208 in FIG. 2. This I/O bridge interfaces with the processor and the memory on one side, and provides an interface to the PCI bus on the other side.

In this example, I/O bridge 304 includes prefetch memory 310 and non-prefetch memory 312. Access to these memories and the transfer of the data using these memories is handled by control logic 314. Control logic 314 may be implemented in different forms, such as a processor or an ASIC. The present invention provides improved cache aligned memory read operations by modifying the starting address for the data transfer in the system memory, memory 306. This modification is performed in system memory 306 in these examples.

Cache aligned memory read operations occur using prefetch memory 310. Memory read operations that are not cache aligned occur using non-prefetch memory 312. When a PCI command, MR or MRL is issued, the data is fetched from the system memory, memory 306, into non-prefetch memory 312, whereas if a MRM command is issued, the data is fetched into prefetch memory 310. These memories are high speed arrays to match with the PCI bus speeds. Typically, non-prefetch memory is a cache line size (128 bytes), and prefetch memory is of multiple cache lines (n * cache line). These examples are implementation specific and can vary from system to system. The memory buffers are located in the I/O bridge.

Network adapter 302 reads data from I/O bridge 304 to generate and send frame 316 onto network 318 in these examples. If the memory is cache aligned, the data may be read from prefetch memory 310.

Turning now to FIG. 4, a diagram illustrating a table of data transfer commands made in transferring data from a memory subsystem to a network adapter using a current transfer process is depicted. With a PCI architecture, three classes of memory reads are present. These memory reads are memory read (MR), memory read line (MRL), and memory read multiple (MRM). A MR command is used to read 1 to 8 bytes of data from a non-prefetchable memory in a single PCI cycle, such as one address phase and one data phase. A MRL command is used to read more than a double word up to the next cache line boundary in a prefetchable address space. MRM is a command used to read a block of data, which crosses a cache line boundary of data in a prefetchable address space.

In table 400, a series of commands are illustrated to show how these different types of commands are used in a typical Ethernet frame having a size of 1514 bytes in which this data is fetched by network adapter from system memory. In this example, the CLS is assumed to be 128 bytes. The I/O bridge in this example has a prefetch capability of 512 bytes with a PCI bus having a width of 64 bits (8 bytes).

Entries 402–434 contain commands used to transfer a 1514 byte Ethernet frame from system memory to the network adapter. Entries 402–406 employ MRM commands used to transfer 1408 bytes of data. Entries 408–434 contain MR commands used to transfer the remaining bytes of data needed to form a 1514 byte frame. As can be seen, all of these MR commands waste bandwidth on the memory sub-system and I/O bus.

Figure 5:
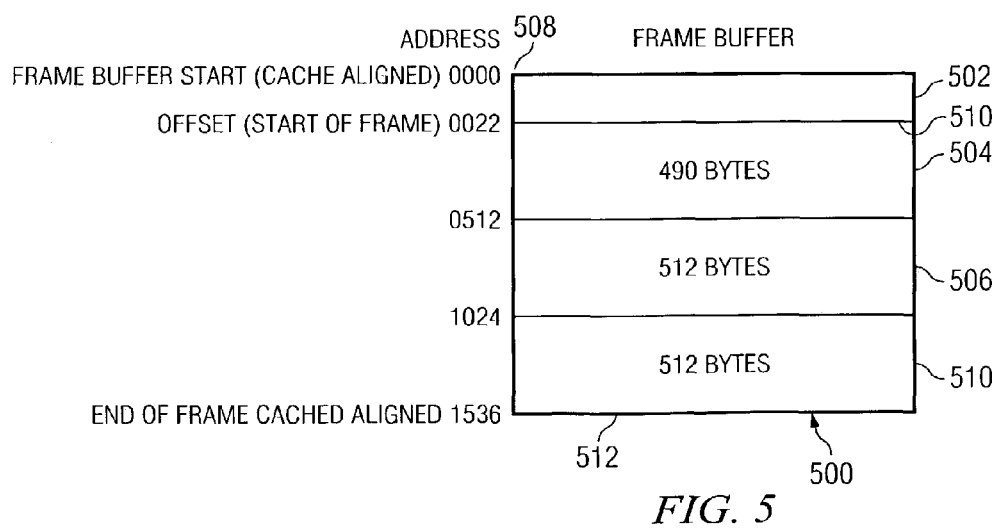
FIG. 5 is a diagram illustrating a frame buffer in accordance with a preferred embodiment of the present invention.

Turning next to FIG. 5, a diagram illustrating a frame buffer is depicted in accordance with a preferred embodiment of the present invention. In this example, frame buffer 500 is an example of a frame buffer in a system memory, such as memory 306 in FIG. 3. In this example, no data is present in section 502 of frame buffer 500. Next, 490 bytes of data are present in section 504, 512 bytes of data are present in section 506, and 512 bytes of data are present in section 508 of frame buffer 500.

Typically, data in the frame buffer is aligned with the beginning of frame buffer 500 at address 508. In these examples, data is offset to address 510. This offset is the start of an Ethernet frame. This offset is made within frame buffer 500 to align the end of the frame with the last transfer of a cache line at the end of frame buffer 500. This end of frame cache alignment is present at address 512. The end of frame cache alignment allows more efficient transfer of data in contrast to having the frame start at the beginning of the frame buffer because the adapter issues MRL or MRM command if the amount of data equals or exceeds cache line. By introducing an offset in the beginning, the last transfer always ends with a MRL or MRM command instead of MR command.

In these examples, the Ethernet frame in frame buffer 500 may have a size ranging from 64 bytes to 1514 bytes. The PCI architecture allows for a CLS in powers of 2, such as 64, 128, and 256. An offset for frame buffer 500 may be set to zero if the frame size is divisible by the CLS without a remainder. If the frame size is not divisible by the CLS without a remainder, then the frame buffer offset is equal to the CLS minus the remainder bytes. The remainder bytes are equal to the frame size minus the total cache aligned bytes. The total cache aligned bytes is found using the following equation:

$$\text{total cache aligned bytes} = ABS(\text{frame size}/CLS)*CLS.$$

Turning next to FIG. 6, a diagram of commands used to transfer a frame of data is depicted in accordance with a preferred embodiment of the present invention. When the end of the frame is aligned with the last transfer of a cache line as illustrated above in FIG. 5, a smaller number of commands are needed to transfer the data. In this example, table 600 includes only three entries, 602, 604, and 606. In this example, only MRM commands are used. MR commands are no longer required in the transfer of this data when the offset is used. As can be seen, in contrast to the number of commands used in table 400 in FIG. 4, a much smaller number of commands are needed to transfer the same amount of data for a 1514 byte Ethernet frame.

Figure 7:
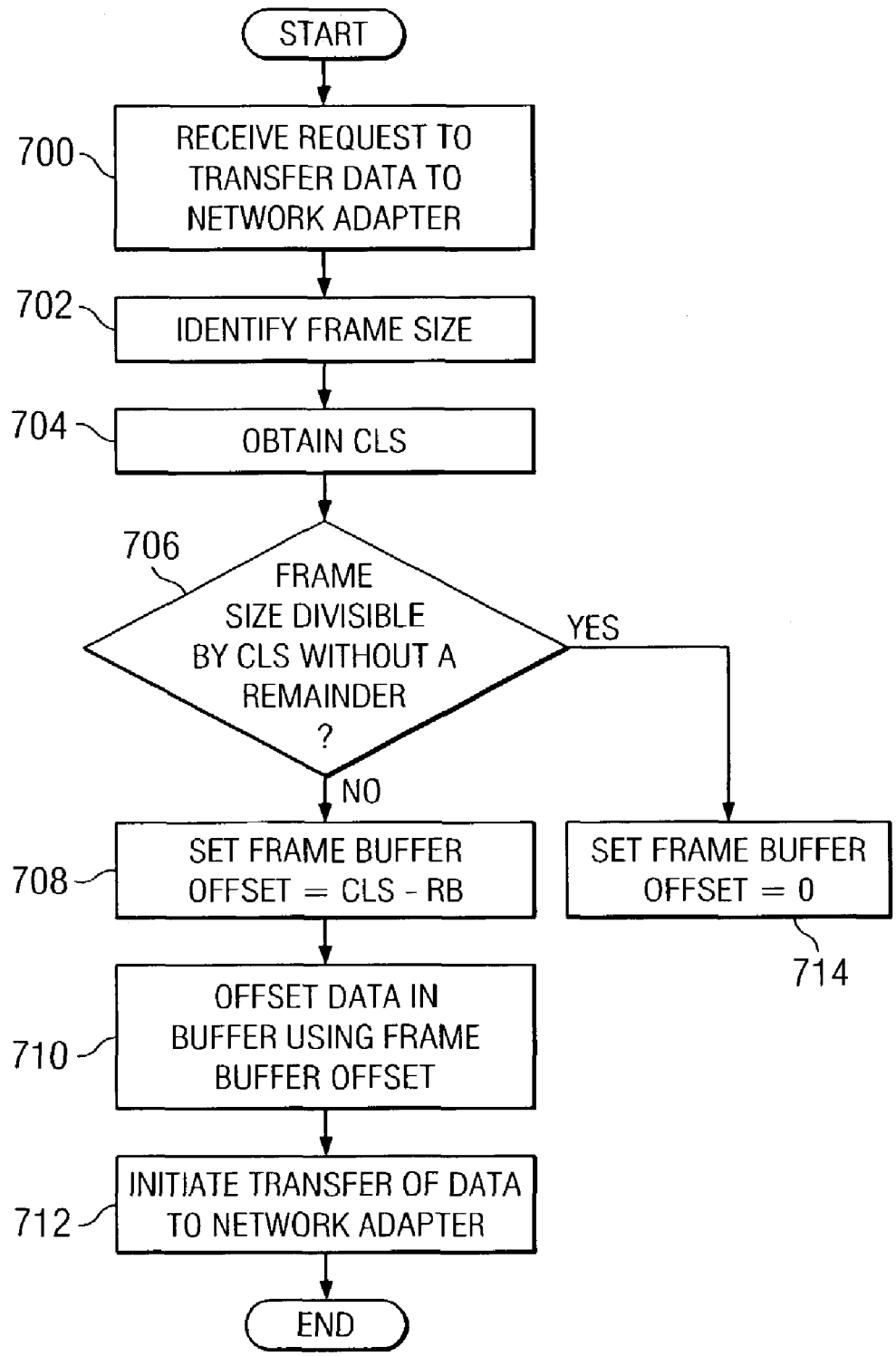
FIG. 7 is a flowchart of a process for aligning data with an offset to maximize transfer efficiency in accordance with a preferred embodiment of the present invention.

Turning next to FIG. 7, a flowchart of a process for aligning data with an offset to maximize transfer efficiency is depicted in accordance with a preferred embodiment of the present invention. The process illustrated in FIG. 7 may be implemented in components such as memory controller 308 and control logic 314 in FIG. 3.

The process begins by receiving a request to transfer data to a network adapter (step 700). Thereafter, a frame size is identified (step 702), and CLS is obtained (step 704). CLS is a static value for a given system and is not dynamically changed. This value is initialized by the system firmware during power up sequence. Next, a determination is made as to whether the frame size is divisible by the CLS without a remainder (step 706).

If the frame size is not divisible by the CLS without a remainder, then the frame buffer offset is set equal to the CLS minus the remainder bytes (RB) (step 708). The RB is equal to the frame size minus the total cache aligned bytes (TCAB). This is identified from the following equation:

$$TCAB = ABS(\text{frame size}/CLS)*CLS.$$

The identified frame buffer offset is used to offset data in the buffer (step 710). This offset is used to provide for an alignment for the end of the frame with the cache line. Next, the transfer of data to the network adapter is initiated (step 712) with the process terminating thereafter.

With reference again to step 706, if the frame size is not divisible by the CLS without a remainder, the frame buffer offset is equal to zero (step 714). The process then proceeds to step 710 as described above.

In this manner, the present invention provides a method, apparatus, and computer instructions for transferring data from a memory to a network adapter. The mechanism of the present invention allows for a significant reduction in the number of PCI bus commands needed to transfer data to a network adapter across a PCI bus. The mechanism of the present invention achieves the efficiencies by modifying the starting address of the data transfer in the memory. This offset is selected to have the data at the end of the frame aligned with the last transfer of the cache line.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transferring data from a memory to a network adapter, the method comprising:

receiving a request to transfer data to a network adapter; and setting an offset for a starting address of the data to align the data with an end of a frame in the memory, wherein the frame is transferred from the memory to the network adapter;

wherein the offset is zero if a frame size of the frame divided by a cache line size is zero.

2. The method of claim 1 further comprising:
initiating a transfer of the frame from the host/system memory to the network adapter.

3. The method of claim 1, wherein the cache line size is $2^n$, wherein n is a positive integer.

4. The method of claim 1, wherein the data is transferred from the memory to the network adapter through a bridge chip.

5. A method in a data processing system for transferring data from a memory to a network adapter, the method comprising:
identifying an amount of the data;
if the frame size for a frame is divisible by a cache line size with a remainder, setting an offset for the data to align the data to an end of the frame;
and if the frame size for the frame size divided by the cache line size without a remainder, setting the offset to zero;
wherein the offset is determined using the following:
offset=CLS−(frame size−ABS(frame size/CLS)*CLS
wherein CLS is the cache line size.

6. The method of claim 5 further comprising:
transferring the frame to the network adapter after offsetting the data using the offset.

7. The method of claim 5 further comprising:
offsetting the data in the frame using the offset.

8. A means in a data processing system for transferring data from a memory to a network adapter, the data processing system comprising:
receiving means for receiving a request to transfer data to a network adapter; and
setting means for setting an offset for a starting address of the data to align the data with an end of a frame in the memory, wherein the frame is transferred from the memory to the network adapter;
wherein the offset is zero if a frame size of the frame divided by a cache line size is zero.

9. The data processing system of claim 8 further comprising:
initiating means for initiating a transfer of the frame from the memory to the network adaptor.

10. The data processing system of claim 8, wherein the cache line size is $2^n$, wherein n is a positive integer.

11. The data processing system of claim 8, wherein the data is transferred from the memory to the network adapter through a bridge chip.

12. A means in a data processing system for transferring data from a memory to a network adapter, the data processing system comprising:
identifying means for identifying an amount of the data;
first setting means for setting an offset for the data to align the data to an end of the frame if the frame size for a frame is divisible by a cache line size with a remainder; and
second setting means for setting the offset to zero if the frame size for if the frame size divided by the cache line size without a remainder;
wherein the offset is determined using the following:
offset=CLS−(frame size−ABS(frame size/CLS)*CLS
wherein CLS is the cache line size.

13. The data processing system of claim 12 further comprising: transferring means for transferring the frame to the network adapter after offsetting the data using the offset.

14. The data processing system of claim 12 further comprising:
offsetting means for offsetting the data in the frame using the offset.

15. A computer program product in a computer readable medium for transferring data from a memory to a network adapter, the computer program product comprising:
first instructions for receiving a request to transfer data to a network adapter; and
second instructions for setting an offset for a starting address of the data to align the data with an end of a frame in the memory, wherein the frame is transferred from the memory to the network adapter;
wherein the offset is zero if a frame size of the frame divided by a cache line size is zero.

16. A computer program product in a computer readable medium for transferring data from a memory to a network adapter, the computer program product comprising:
first instructions for identifying an amount of the data;
second instructions for setting an offset for the data to align the data to an end of the frame if the frame size for a frame is divisible by a cache line size with a remainder; and
third instructions for setting the offset to zero if the frame size for if the frame size divided by the cache line size without a remainder;
wherein the offset is determined using the following:
offset=CLS−(frame size−ABS(frame size/CLS)*CLS
wherein CLS is the cache line size.

17. A server data processing system for obtaining cultural context information from a client, the server data processing system comprising:
a bus system;
a network adapter connected to the bus system;
a memory connected to the bus system, wherein the memory includes a set of instructions; and
a processing unit connected to the bus system, wherein the processing unit executes a set of instructions to receive a request to transfer data to a network adapter; and set an offset for a starting address of the data to align the data with an end of a frame in the memory, wherein the frame is transferred from the memory to the network adapter;
wherein the offset is zero if a frame size of the frame divided by a cache line size is zero.

18. A server data processing system for obtaining cultural context information from a client, the server data processing system comprising:
a bus system;
a network adapter connected to the bus system;
a memory connected to the bus system, wherein the memory includes a set of instructions; and
a processing unit connected to the bus system, wherein the processing unit executes a set of instructions to identify an amount of the data; set an offset for the data to align the data to the end of the frame if the frame size for a frame is divisible by a cache line size with a remainder; and to set the offset to zero if the frame size is divided by the cache line size without a remainder;
wherein the offset is determined using the following:
offset=CLS−(frame size−ABS(frame size/CLS)*CLS
wherein CLS is the cache line size.

* * * * *